US012619895B2

(12) United States Patent
Li et al.

(10) Patent No.: US 12,619,895 B2
(45) Date of Patent: May 5, 2026

(54) OBSERVATION DATA EVALUATION

(71) Applicant: International Business Machines Corporation, Armonk, NY (US)

(72) Inventors: Jing Li, Beijing (CN); Jing Mei, Beijing (CN); Fan Li, Shanghai (CN); Ya Bin Dang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 17/373,928

(22) Filed: Jul. 13, 2021

(65) Prior Publication Data

US 2023/0022054 A1    Jan. 26, 2023

(51) Int. Cl.
G06N 5/048 (2023.01)
G06F 18/20 (2023.01)
G06F 18/243 (2023.01)

(52) U.S. Cl.
CPC ....... G06N 5/048 (2013.01); G06F 18/24323 (2023.01); G06F 18/285 (2023.01)

(58) Field of Classification Search
CPC ........... G06F 18/2337; G06F 18/24323; G06F 18/285; G06N 5/01; G06N 5/022; G06N 5/048; G16H 40/67; G16H 50/20; G16H 50/30; G16H 50/70
See application file for complete search history.

(56) References Cited

U.S. PATENT DOCUMENTS

2003/0176931 A1* 9/2003 Pednault .................. G06N 7/01
700/44

2021/0174503 A1* 6/2021 Trautwein .............. G16H 50/70
2023/0186106 A1* 6/2023 Valdes ..................... G06N 5/01
706/46

FOREIGN PATENT DOCUMENTS

CN    105224808 A    1/2016
CN    106096838 A    11/2016

OTHER PUBLICATIONS

Pulkkinen et al., "Fuzzy classifier identification using decision tree and multiobjective evolutionary algorithms", Oct. 17, 2007, International Journal of Approximate Reasoning 48 (2008), pp. 526-543. (Year: 2007).*

(Continued)

*Primary Examiner* — Brent Johnston Hoover
(74) *Attorney, Agent, or Firm* — Elliot J. Shine

(57) ABSTRACT

Embodiments of the present disclosure relate to methods, systems, and computer program products for observation data evaluation. In a method, a hierarchical relationship between a plurality of observation items is obtained based on a dataset including a plurality of observation samples. Here, an observation sample in the plurality of observation samples includes a group of measurements for the group of observation items, respectively. A plurality of evaluation models for evaluating an observation sample is generated based on the hierarchical relationship according to a predefined group of membership functions and a predefined group of fuzzy operators. An evaluation model is selected for a further evaluation from the plurality of evaluation models based on a plurality of confidence intervals for the plurality of evaluation models. With these embodiments, the evaluation model may be obtained in an easy and more effective way.

19 Claims, 6 Drawing Sheets

500

510
DETERMINE A HIERARCHICAL RELATIONSHIP BETWEEN A PLURALITY OF OBSERVATION ITEMS BASED ON A DATASET INCLUDING A PLURALITY OF OBSERVATION SAMPLES, AN OBSERVATION SAMPLE IN THE PLURALITY OF OBSERVATION SAMPLES INCLUDING A GROUP OF MEASUREMENTS FOR THE GROUP OF OBSERVATION ITEMS, RESPECTIVELY

520
GENERATE A PLURALITY OF EVALUATION MODELS FOR EVALUATING AN OBSERVATION SAMPLE BASED ON THE HIERARCHICAL RELATIONSHIP ACCORDING TO A PREDEFINED GROUP OF MEMBERSHIP FUNCTIONS AND A PREDEFINED GROUP OF FUZZY OPERATORS

530
SELECT AN EVALUATION MODEL FOR A FURTHER EVALUATION FROM THE PLURALITY OF EVALUATION MODELS BASED ON A PLURALITY OF CONFIDENCE INTERVALS FOR THE PLURALITY OF EVALUATION MODELS

(56)                  References Cited

OTHER PUBLICATIONS

Yazdanparast et al., "Differentiation of inflammatory papulosquamous skin diseases based on skin biophysical and ultrasonographic properties: A decision tree model", Oct. 6, 2020, Indian J Dermatol Venereol Leprol 2020, pp. 1-7. (Year: 2020).*

Mell et al., "The NIST Definition of Cloud Computing," Recommendations of the National Institute of Standards and Technology, U.S. Department of Commerce, Special Publication 800-145, Sep. 2011, 7 pages.

Tang et al., "CAPP Based on Automatic Fuzzy Comprehensive Evaluation," Key Engineering Materials, vols. 426-427 (2010), pp. 648-652. <https://www.scientific.net/KEM.426-427.648>.

Tang et al., "Computer-aided process planning based on automatic fuzzy comprehensive evaluation," Proc. IMechE vol. 224 Part B: J. Engineering Manufacture, Oct. 19, 2009, pp. 869-877. <https://journals.sagepub.com/doi/abs/10.1243/09544054JEM1739?journalCode=pibb>.

Wei et al., "Online Comment-Based Hotel Quality Automatic Assessment Using Improved Fuzzy Comprehensive Evaluation and Fuzzy Cognitive Map," IEEE Transactions on Fuzzy Systems, vol. 23, No. 1, Feb. 2015, pp. 72-84. <https://ieeexplore.ieee.org/document/7005376>.

Wei et al., "Research on Building Fire Risk Fast Assessment Method Based on Fuzzy comprehensive evaluation and SVM," 2017 8th International Conference on Fire Science and Fire Protection Engineering, Procedia Engineering 211 (2018), pp. 1141-1150. <https://www.researchgate.net/publication/322995364>.

Xu et al., "The fuzzy comprehensive evaluation (FCE) and the principal component analysis (PCA) model simulation and its applications in water quality assessment of Nansi Lake Basin, China," Environmental Engineering Research 2021; 26(2): 200022, May 26, 2020, 16 pages. <http://www.eeer.org/journal/view.php?number=1165>.

* cited by examiner

400

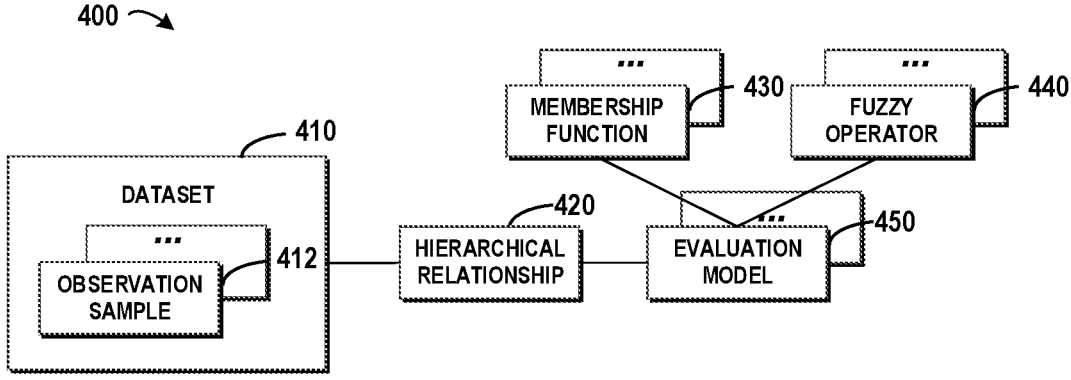

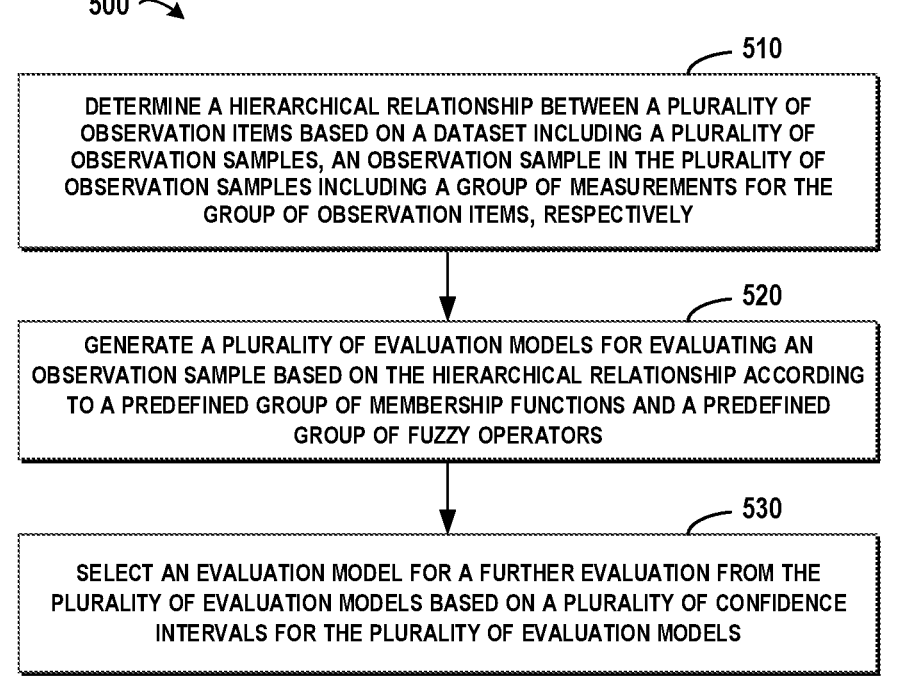

510

DETERMINE A HIERARCHICAL RELATIONSHIP BETWEEN A PLURALITY OF OBSERVATION ITEMS BASED ON A DATASET INCLUDING A PLURALITY OF OBSERVATION SAMPLES, AN OBSERVATION SAMPLE IN THE PLURALITY OF OBSERVATION SAMPLES INCLUDING A GROUP OF MEASUREMENTS FOR THE GROUP OF OBSERVATION ITEMS, RESPECTIVELY

520

GENERATE A PLURALITY OF EVALUATION MODELS FOR EVALUATING AN OBSERVATION SAMPLE BASED ON THE HIERARCHICAL RELATIONSHIP ACCORDING TO A PREDEFINED GROUP OF MEMBERSHIP FUNCTIONS AND A PREDEFINED GROUP OF FUZZY OPERATORS

530

SELECT AN EVALUATION MODEL FOR A FURTHER EVALUATION FROM THE PLURALITY OF EVALUATION MODELS BASED ON A PLURALITY OF CONFIDENCE INTERVALS FOR THE PLURALITY OF EVALUATION MODELS

OBSERVATION DATA EVALUATION

BACKGROUND

The present invention relates to data processing, and more specifically, to methods, systems, and computer program products for evaluating observation data.

Nowadays, evaluation systems are provided for evaluating states of various types of objects. For example, in a skincare product industry, skin states of multiple persons should be evaluated as one from four levels ("excellent," "good," "moderate," and "poor") before product developments. In another example, in a manufacturing industry, various aspects of a product should be observed to determining a quality level of the product. There have been proposed solutions for evaluating various objects. However, these solutions heavily depend on expert knowledge and manual operations.

SUMMARY

According to one embodiment of the present disclosure, there is provided a computer-implemented method that may be implemented by one or more processors. In the method, one or more processors obtain a hierarchical relationship between a plurality of observation items based on a dataset including a plurality of observation samples. Here, an observation sample in the plurality of observation samples includes a group of measurements for the group of observation items, respectively. One or more processors generate a plurality of evaluation models for evaluating an observation sample based on the hierarchical relationship according to a predefined group of membership functions and a predefined group of fuzzy operators. One or more processors select an evaluation model from the plurality of evaluation models based on a plurality of confidence intervals for the plurality of evaluation models.

According to another embodiment of the present disclosure, there is provided a computer-implemented system. The computer-implemented system comprises a computer processor coupled to a computer-readable memory unit, where the memory unit comprises instructions that when executed by the computer processor implements the above method.

According to another embodiment of the present disclosure, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts an example procedure for obtaining an evaluation model according to an embodiment of the present disclosure.

FIG. 5 depicts a flowchart of an example method for obtaining an evaluation model according to an embodiment of the present disclosure.

DETAILED DESCRIPTION

Figure 1:
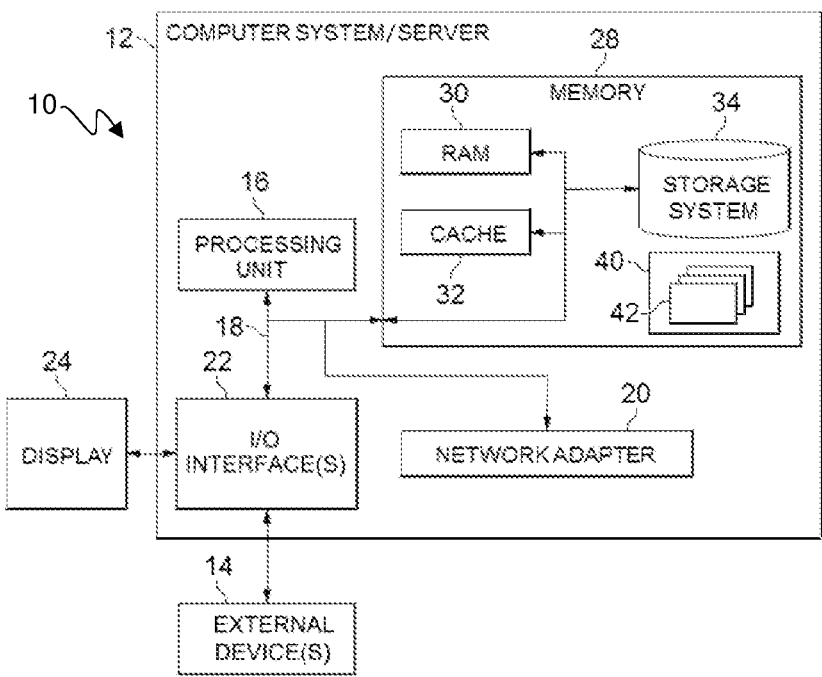
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
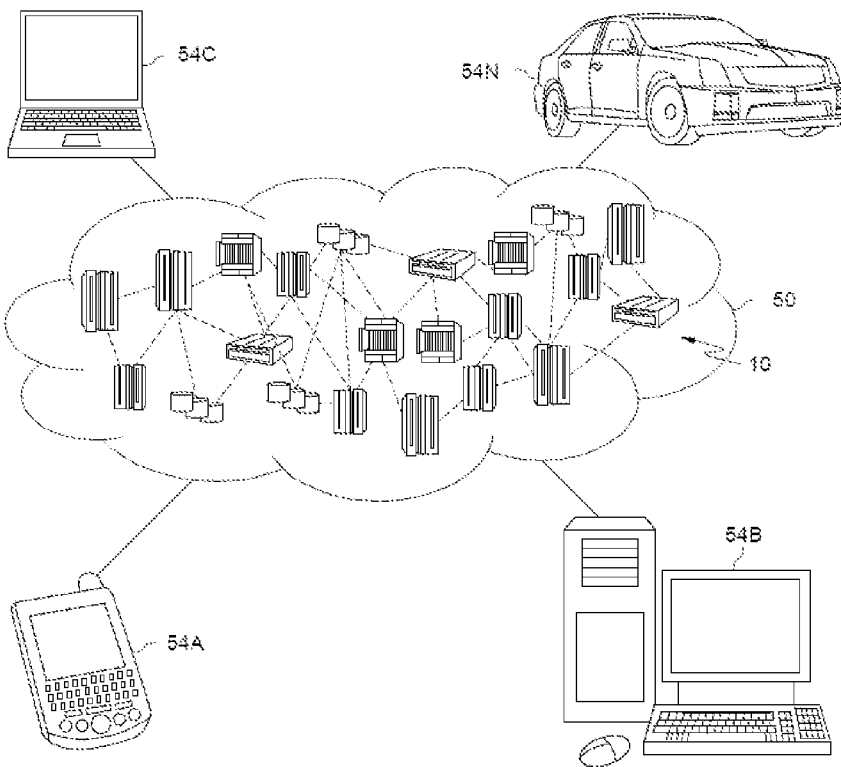
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
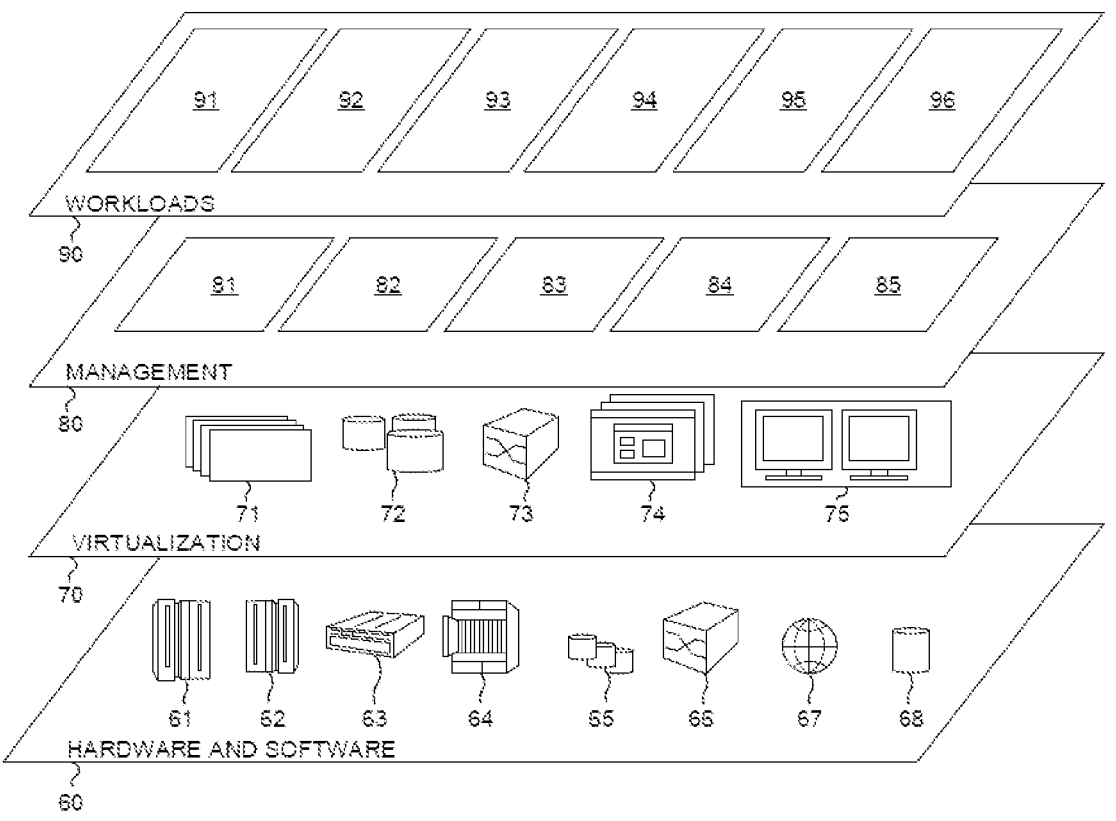
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the observation data processing 96.

It should be noted that the observation data processing 96 according to embodiments of the present disclosure could be implemented by computer system/server 12 of FIG. 1. A working environment of the present disclosure will be described below. For the sake of clarity, embodiments of the present disclosure will be descripted by taking the skincare industry as an example environment. Here, the various items of the skin of a plurality of persons may be observed. For example, observation items may include: the pimple, the dark circle around the eye, the acne mark, the chloasma, the freckle, and so on. It is to be understood that the skincare industry is just an example environments where the plurality of observation items are collected. The present disclosure may be implemented in other environments such as the manufacturing industry, where various aspect of a product (such as a color, a size, a weight, and so on) may be observed for evaluating a quality level of the product. Further, the present disclosure may be implemented for evaluating a failure level for a computing system, evaluating a health level for a person, and so on.

Solutions have been provided for building an evaluation model based on a plurality of observation samples according to machine learning technologies. However, these solutions greatly depend on expert knowledge and manual operations. In supervised learning technology, a plurality of observation samples are collected and labelled for training the evaluation model. Although other solutions are provided for building the evaluation model based on unsupervised learning technology, these solutions still require rich and deep expert knowledge for the training. Accordingly, it is desired to provide a new solution for obtaining an evaluation model in a more convenient and effective way.

In view of the above drawbacks, embodiments of the present disclosure provide solutions for obtaining an evaluation model. Reference will be made to FIG. 4 for a brief overview of embodiments of the present disclosure. FIG. 4 depicts an example procedure 400 for obtaining an evaluation model according to embodiments of the present disclosure. In FIG. 4, a dataset 410 including a plurality of observation samples 412 may be obtained. Here, an observation sample in the plurality of observation samples 412 includes a group of measurements for the group of observation items, respectively. In the above example for the skincare industry, the observation items may include a pimple, a dark circle, an acne mark, a chloasma, a freckle, and so on. Here, the observation item refers to an aspect of the skin that may be directly observed. For example, the pimple item may be measured by the number of the pimples in the face, and the dark circle item may be represented by an area of the dark circle.

As shown in FIG. 4, a hierarchical relationship 420 may be determined between the plurality of observation items based on the dataset 410. Further, a plurality of evaluation models 450 may be generated for evaluating an observation sample based on the hierarchical relationship 420 according to a predefined group of membership functions 430 and a predefined group of fuzzy operators 440. Here, the membership functions 430 and the fuzzy operators 440 may be obtained in advance. For example, existing membership functions and fuzzy operators that are typically used in the art may be used. Further, an evaluation model may be selected from the plurality of evaluation models 450 based on performances of those evaluation models 450. Specifically, a plurality of confidence intervals may be respectively determined for the plurality of evaluation models 450 for selecting the one evaluation model.

Hereinafter, reference will be made to FIG. 5 for more details about embodiments of the present disclosure. FIG. 5 depicts a flowchart of an example method 500 for obtaining an evaluation model according to embodiments of the present disclosure. At a block 510, the hierarchical relationship 420 may be determined between the plurality of observation items based on the dataset 410 including the plurality of observation samples 412. Here, an observation sample in the plurality of observation samples may include a group of measurements for the group of observation items, respectively. Specifically, the dataset 410 may be represented by a data structure as shown in Table 1.

TABLE 1

| | | | | Example Data Structure for Dataset | | | | |
|---|---|---|---|---|---|---|---|---|
| No. | Pimple $u_1$ | Dark circle $u_2$ | Acne mark $u_3$ | Chloasma $u_4$ | . . . | Freckle $u_i$ | . . . | Others $u_k$ |
| 1 | $x_{11}$ | $x_{12}$ | $x_{13}$ | $x_{14}$ | | $x_{1i}$ | | $x_{1k}$ |
| 2 | | | | | | | | |
| . . . | . . . | . . . | . . . | . . . | . . . | . . . | | . . . |
| w | $x_{w1}$ | $x_{w2}$ | $x_{w3}$ | $x_{w4}$ | | $x_{wi}$ | | $x_{wk}$ |

In Table 1, the plurality of observation items includes k items, and $u_i$ represents the $i^{th}$ observation item in the plurality of observation items. The dataset includes w observation samples and each sample represent measurements collected from one person. For example, $x_{ij}$ represents a measurement for the $j^{th}$ item collected from the $i^{th}$ person.

Figure 6A:
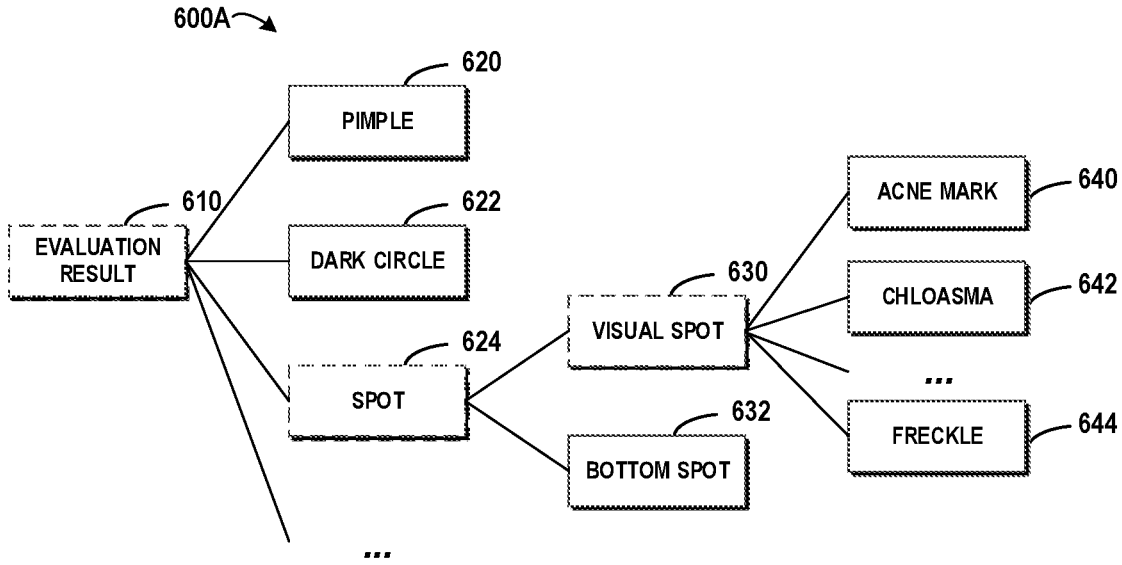
FIG. 6A depicts an example tree structure associated with a plurality of observation items according to an embodiment of the present disclosure.

Based on the dataset 410, the hierarchical relationship 420 may be determined and reference will be made to FIGS. 6A and 6B for details. FIG. 6A depicts an example tree structure 600A associated with a plurality of observation items according to embodiments of the present disclosure. In embodiments of the present disclosure, the hierarchical relationship may be represented by a tree structure 600A that is based on learned knowledge associated with the plurality of observation items. In the tree structure 600A, leaf nodes 620, 622, 632, 640, 642, and 644 are shown by solid blocks, which indicate that these leaf nodes directly correspond to the plurality of observation items. Nodes 610, 624, and 630 shown by dash blocks represent aspects of the skin that are not directly observed, because these nodes depend on the observation items in their child nodes. A root node of the tree structure 600A corresponds to an evaluation result 610 for the plurality of observation items.

It is to be understood that the above tree structure 600A does not require rich and deep expert knowledge in the skincare industry. Instead, the hierarchical relationship may be obtained directly from the taxonomy related to the skin states. For example, based on the common knowledge, the skin state may be evaluated on aspects such as the pimple, the dark circle, the spot, and so on. Therefore, nodes 620, 622 and 624 may be added to the root node 610. Further, the spot in the face may include visual spots and bottom spots, and thus the nodes 630 and 632 may be added to the node 624. Likewise, the nodes 640, 642, and 644 may be added to the node 630 based on a fact that the visual spot may include acne marks, chloasma, freckles, etc. With embodiments of the present disclosure, it does not require experts to build the tree structure 600A, and common engineers in the data processing field may obtain the tree structure 600A for representing the hierarchical relationship between the plurality of observation items.

It is to be understood that a great number of observation items may be collected. However, some of the observation items slightly affect the evaluation result 610 and only a portion of important observation items greatly affect the evaluation result 610. Accordingly, the tree structure 600A may be trimmed to remove unimportant observation items. In embodiments of the present disclosure, the tree structure 600A may be trimmed with respect to each subtree in the tree structure 600A, and reference will be made to FIG. 6B for depicting an example subtree structure 600B associated with a portion of the plurality of observation items according to embodiments of the present disclosure.

Figure 6B:
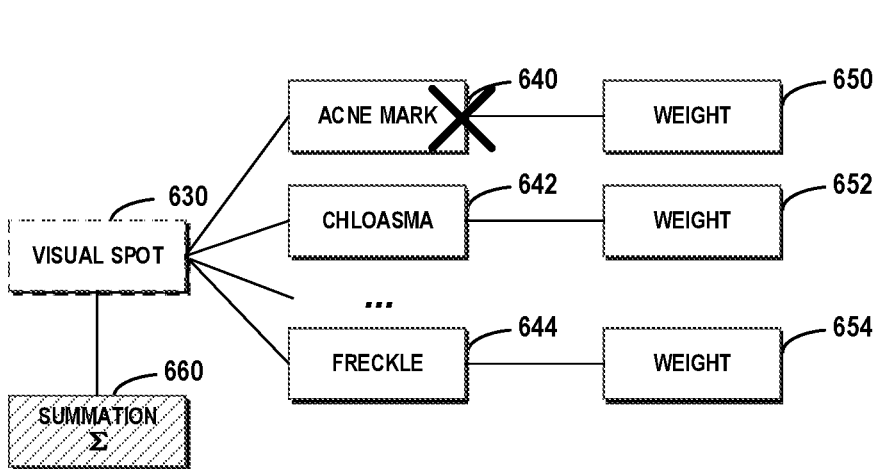
FIG. 6B depicts an example subtree structure associated with a portion of the plurality of observation items according to an embodiment of the present disclosure.

In FIG. 6B, an example subtree structure 600B with a root node of the visual spot node 630 is shown. Here the subtree structure 600B may include only one layer, and the nodes 640, 642, and 644 are direct children of the node 630. Here, the node visual spot 630 indicates a root node of the subtree 600B and the nodes 640, 642, and 644 indicate leaf nodes of the subtree 600B. In the subtree structure 600B, a weight between a root node of the subtree and a child node of the root node may be determined based on the plurality of observation samples. Specifically, a weight 650 may be determined between the nodes 630 and 640. Here, the weight 650 indicates an association between "visual spot 630" and the observation item "acne mark 640." In other words, the weight 650 represents the influence of the acne mark to the visual spot. Further, a weight 652 may be determined between the nodes 630 and 642, and a weight 654 may be determined between the nodes 630 and 644. The weight may indicate an influence degree that is applied by these leaf nodes to the root node 630. For example, if the weight 650 is high, it means that the acne mark is an important observation item that greatly affects the visual spot; and if the weight 650 is low, it means that the acne mark is an unimportant observation item and may be removed.

In embodiments of the present disclosure, the weights may be determined based on the Exploratory Factor Analysis (EFA) technique. Specifically, measurements in the above Table 1 may be used to determine each of the weights 650, 652, and 654. Supposing that the subtree has p leaf nodes, then the weights may be represented by $a_{j1}, \ldots, a_{ji}, \ldots$ and $a_{jp}$. The following rules may be applied to the determined weights for removing unimportant observation items. For example, if $a_{ji}<0.4$ (for all i), then the weight $a_{ji}$ may be identified as an unimportant weight and thus the observation item corresponding to the weight may be removed from the subtree. In another example, if $$h_j^2 = \sum_{i=1}^{p} a_{ji}^2 < 0.4$$

then the observation item corresponding to weight $a_{ji}$ may be removed. In still another example, other rules may be used for filtering unimportant observation items.

As shown in FIG. 6B, as the weight 650 meets the above filtering rules, the observation item "acne mark" may be removed from the plurality of observation items, and the leaf node 640 may be trimmed from the subtree structure 600B. It is to be understood that FIG. 6B is just an example for the trimming procedure; in other embodiments, more or less observation items may be removed. For example, if none of the weights meets the above filtering rules, it means that all these observation items are important and thus the subtree may remain unchanged. In another example, if more weights meet the above filtering rules, then observation items corresponding to these weights may be removed.

Further, a summation may be determined based on the leaf nodes in the trimmed subtree. Supposing the trimmed subtree has q leaf nodes after the trimming procedure, a value of the node 630 may be represented by a summation 660 of the weighted measurements for each of the observation items such as the chloasma and the freckle as below:

$$X_j = a_{j1}x_{j1} + \ldots + a_{ji}x_{ji} + \ldots a_{jq}x_{jq} + e_j \qquad \text{Formula 1}$$

Where the integer j represents the $j^{th}$ sample in the plurality of observation samples, $X_j$ represents the summation 660 for the visual spot node 630, $a_{ji}$ represents a weight determined from the $j^{th}$ sample in the plurality of observation samples for the $i^{th}$ observation item in the leaf nodes, and $x_{ji}$ represents the measurement in the above Table 1, and $e_j$ represents an offset for the summation 660. Formula 1 may be implemented for each of the plurality of observation samples and thus the summation 660 for the visual spot node 630 may be represented by the measurements in the dataset.

With these embodiments, unimportant observation items may be removed from the subtree in an effective and easy manner. Further, the above trimming procedure may be implemented to other subtrees in the tree structure 600A. Supposing the node 632 also has child nodes (i.e., the bottom spot 632 may be classified into more detailed types), then the trimming procedure may be implemented to the subtree with a root node of the node 632.

In embodiments of the present disclosure, the trimming procedure may be implemented to each subtree along a direction from the leaf nodes to the root node in the tree structure 600A. Specifically, the node 630 may be represented by the summation 660 based on the weights and the measurements related to the leaf nodes in the trimmed subtree. At this point, the node 630 may be considered as a new leaf node and the above trimming procedure may be implemented to a subtree at an upper layer. For example, a subtree (having a root node of the node 624 and leaf nodes 630 and 632) may be processed in a similar manner. Therefore, the root node 610 of the subtree may be represented by a summation associated with root nodes of its subtrees.

In embodiments of the present disclosure, the trimming procedure may be implemented in an iterative way until the node 610 is represented by a summation of measurements for all the remained observation items. Therefore, the original tree structure 600A may be simplified according to the trimming procedure and thus only important observation items are left for further processing. Based on the above, the hierarchical relationship may be represented based on the trimmed tree structure and the group of weights.

Figure 7:
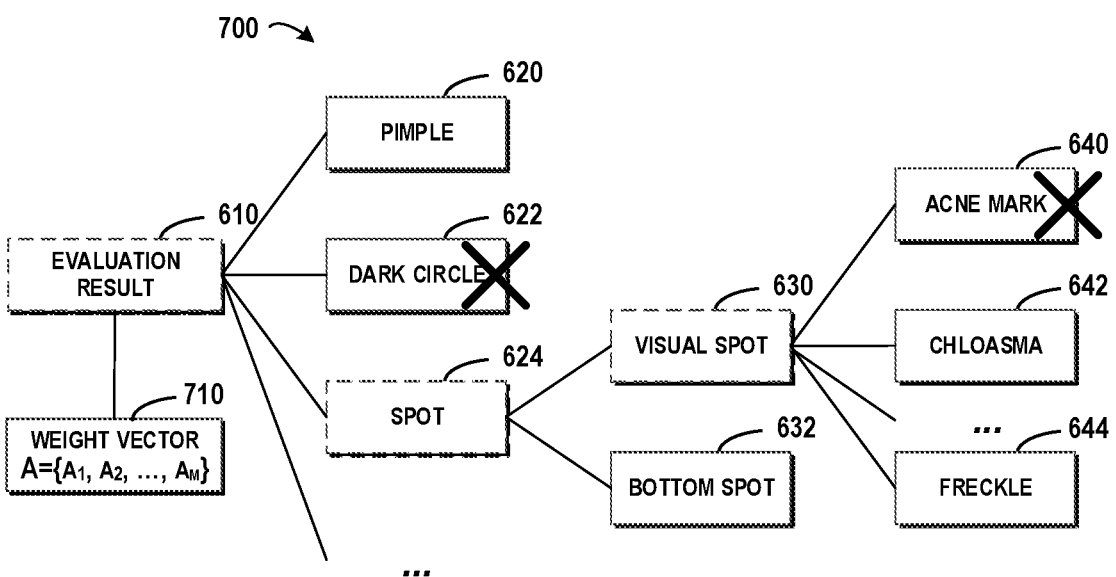
FIG. 7 depicts an example tree structure after a trimming procedure according to an embodiment of the present disclosure.

FIG. 7 depicts an example tree structure 700 after a trimming procedure according to embodiments of the present disclosure. As shown, the leaf nodes 622 and 640 are removed, and the number of the observation items is reduced by 2. Supposing n observation items are left in the trimmed tree structure, the hierarchical relationship may include a group of n weights for the n observation items, respectively. For the sake of illustration, the group of weights may be represented by a weight vector 710 (represented by $A=(a_1, a_2, \ldots, a_n)$).

In some embodiments of the present disclosure, the weight vector may be determined according to the Principal Component Analysis (PCA) algorithm. Specifically, based on the n observation items, the original dataset 410 may also be filtered to remove measurements related to the removed observation items. Therefore, measurements for the w observation samples may be represented in a matrix X as below:

$$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{w2} & x_{w2} & \ldots & x_{wn} \end{bmatrix}$$

Further, the matrix X may be normalized to a normalized matrix Z, where $$z_{ij} = \frac{x_{ij} - \overline{x_j}}{s_j}$$

and $S_j$ represents the standard deviation of the $j^{th}$ sample.

$$Z = \begin{bmatrix} z_{11} & z_{12} & \ldots & z_{1n} \\ z_{21} & z_{22} & \ldots & z_{2n} \\ \ldots & \ldots & \ldots & \ldots \\ z_{w2} & z_{w2} & \ldots & z_{wn} \end{bmatrix}$$

Next, a correlation coefficient matrix $$C = \begin{bmatrix} c_{11} & c_{12} & \cdots & c_{1n} \\ c_{21} & c_{22} & \cdots & c_{2n} \\ \cdots & \cdots & \cdots & \cdots \\ c_{w2} & c_{w2} & \cdots & c_{wn} \end{bmatrix}$$

may be determined based on the existing solutions according to the normalized matrix Z, and details are omitted hereinafter. It is to be understood that the above steps may be implemented to each observation sample in the filtered dataset and thus w correlation coefficient matrixes may be obtained, and each correlation coefficient matrix is in the format of the above correlation coefficient matrix C. Further, the PCA algorithm may be used to obtain the weight vector $A=(a_1, a_2, \ldots, a_n)$.

Having described determination of the hierarchical relationship, the following paragraphs will provide further details about generating the plurality of evaluation models. Referring back to FIG. 5, at a block 520, the plurality of evaluation models 450 may be generated for evaluating an observation sample based on the hierarchical relationship according to a predefined group of membership functions 430 and a predefined group of fuzzy operators 440. Here, the multiple of evaluation models are intermediate models during a determination of a final evaluation model for a further evaluation. Information of these evaluation models may be provided to the outside. For example, a user interface may be provided for specifying a desired number of the plurality of evaluation models. Alternatively and/or in addition to, these evaluation models may not be exposed to the outside. It is understood that the membership function is a mathematical term that describes a distribution between measurements among various levels of evaluations for the observation items. Multiple membership functions are discovered in the mathematics field, and thus those membership functions may be used for generating the evaluation models.

Figure 8:
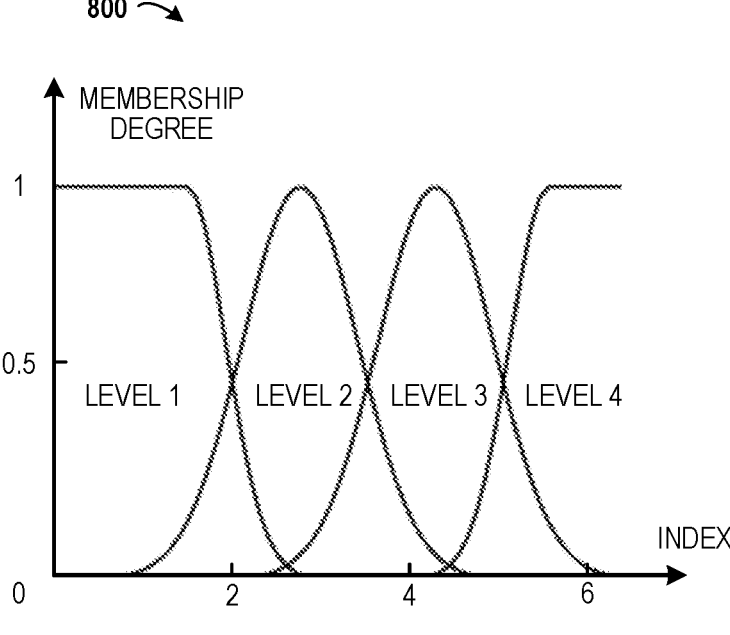
FIG. 8 depicts an example membership function according to an embodiment of the present disclosure.

Reference will be made to FIG. 8 for more details about the membership function. FIG. 8 depicts an example membership function according to embodiments of the present disclosure. The horizontal axis in FIG. 8 indicates an index related to the membership function, and the vertical axis indicates a membership degree. In embodiments of the present disclosure, a count (represented by m) of levels that are to be included in the evaluation result may be obtained for the evaluation model. In the above example of the skin observation, the index may represent a state of the skin, which is to be classified into four levels: "excellent," "good," "moderate," and "poor", and thus the membership function in FIG. 8 divides the total index space into 4 levels. Specifically, clustering algorithms may be applied to the measurements to obtain a strain energy storage index (F). Based on the membership function as shown in FIG. 8, the following four levels may be obtained:

$$\begin{cases} \text{Level 1:} F < 2 \\ \text{Level 2:} 2 \leq F \leq 3.5 \\ \text{Level 3:} 3.5 \leq F \leq 5 \\ \text{Level 4:} F > 5 \end{cases} \qquad \text{Formula 2}$$

It is to be understood that FIG. 8 only provides an example membership function. In other embodiments of the present disclosure, other membership functions may be selected from a known membership function library for generating the evaluation models. For example, if there are five membership functions in the library, then with respect to a predefined fuzzy operator, five evaluation models may be generated from the five membership functions.

Figure 9:
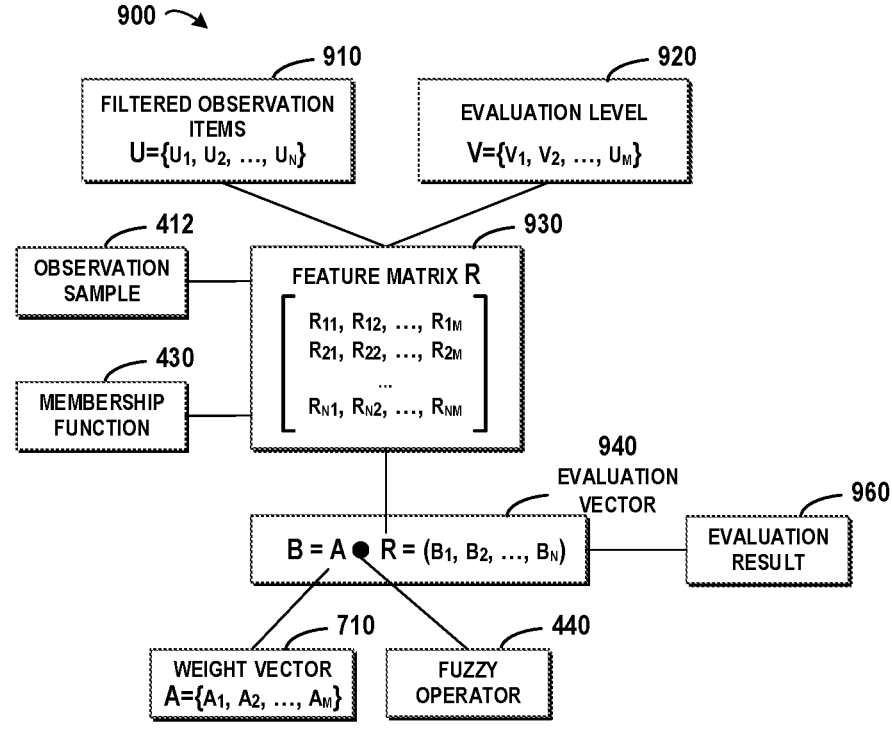
FIG. 9 depicts an example procedure for determining an evaluation result according to an embodiment of the present disclosure.

With the selected membership function, a plurality of feature matrixes may be generated for the plurality of samples, respectively. Reference will be made to FIG. 9 for more details about determining the feature matrix. FIG. 9 depicts an example procedure 900 for determining an evaluation result according to embodiments of the present disclosure. In FIG. 9, filtered observation items 910 may be obtained. Here, the filtered observation items 910 include the n observation items are left in the trimmed hierarchical relationship. Based on the n observation items, the original dataset 410 may also be filtered to remove measurements for the removed observation items. With the selected membership function and the count m for the desired levels, the evaluation result may be mapped to m levels. Further, with respect to a specific observation sample in the dataset, a feature matrix 930 (represented by R) may be generated based on the filtered observation items 910, the evaluation levels 920 (represented by $V=(v_1, v_2, \ldots, v_m)$), and the membership function 430.

Once the filtered observation items 910, the evaluation levels 920, and the membership function 430 are specified, a feature matrix $$R = \begin{bmatrix} r_{11} & r_{12} & \cdots & r_{1m} \\ r_{21} & r_{22} & \cdots & r_{2m} \\ \cdots & \cdots & \cdots & \cdots \\ r_{n2} & r_{n2} & \cdots & r_{nm} \end{bmatrix}$$

may be automatically generated for each sample with existing algorithms. Here, a single feature matrix R may be generated for each observation sample in the filtered dataset, therefore w feature matrixes may be generated from the filtered dataset.

Still referring to FIG. 9, an evaluation vector 940 may be determined based on the weight vector 710 and feature matrix 930. Specifically, a fuzzy operator 440 may be selected to convert the weight vector 710 and feature matrix 930 into the evaluation vector 940. In embodiments of the present disclosure, the fuzzy operator is a mathematical term that defines a mathematical operation that is implemented to a vector (such as the above weight factor 710) and a matrix (such as the above feature matrix 930). Multiple fuzzy operators may be included in a fuzzy operator library. For example, a fuzzy operator $M(\wedge, \vee)$ may be represented as below:

$$b_j = \bigvee_{i=1}^{m} (a_i \wedge r_{ij}) = \max_{1 \leq i \leq m}\{\min(a_i, r_{ij})\}, j = 1, 2, \ldots, n \qquad \text{Formula 3}$$

Where $b_j$ represents the member at the $j^{th}$ position in the evaluation vector $B=(b_1, b_2, \ldots, b_n)$, $a_i$ represents the member at the $i^{th}$ position in the weight vector $A=(a_1, a_2, \ldots, a_n)$, $r_{ij}$ represents a member at the (i,j) position in the feature matrix R, n represents the number of observation items in the filtered dataset, and m represents the count of the levels for the evaluation result.

It is to be understood that the above Formula 3 is just an example fuzzy operator for converting the weight vector 710 and feature matrix 930 into the evaluation vector 940. Other fuzzy operators such as $M(\bullet, v)$, $M(\bullet, \oplus)$, and $M(\wedge, \oplus)$ may be selected for determining the evaluation vector 940. It is to be understood that multiple evaluation models may be generated based on different fuzzy operators. Supposing there are four fuzzy operators, four evaluation models may be generated with respect to a given membership function. In embodiments of the present disclosure, an evaluation model may be generated based on the trimmed tree structure and the group of weights according to the selected membership function and the selected fuzzy operator. Supposing there are five membership functions and four fuzzy operators, then there will be 5*4=20 evaluation models in total.

Here, each of the evaluation models may convert an observation sample in the filtered dataset into a corresponding evaluation vector 940, and then an evaluation result 960 may be determined from the evaluation vector 940. For example, a maximum value in the evaluation vector $B=(b_1, b_2, \ldots, b_n)$ may be considered as the final evaluation result 960. Alternatively and/or in addition to, other mathematical operations may be implemented to the evaluation vector B for determining the evaluation result 960.

Having described how to generate the plurality of evaluation models, hereinafter, reference will be made back to FIG. 5 for more details about selecting the evaluation model. At a block 530, an evaluation model for a further evaluation may be selected from the plurality of evaluation models based on a plurality of confidence intervals for the plurality of evaluation models. Specifically, based on an evaluation dataset, the plurality of confidence intervals may be determined for the plurality of evaluation models, respectively. In some embodiments of the present disclosure, a user interface may be provided for specifying a criterion for selecting the final evaluation model. If the confidence interval criterion is selected, then the final evaluation model may be selected based on the confidence interval. Here, the filtered dataset may work as the evaluation dataset. Alternatively and/or in addition to, another dataset may work as the evaluation dataset. Specifically, a data structure of the evaluation dataset may be similar as the above Table, and the evaluation dataset may include a plurality of evaluation samples. Here, an evaluation sample in the plurality of evaluation samples may include a group of measurements for the group of observation items, respectively.

In order to determine the plurality of confidence intervals, based on the plurality of evaluation samples and the hierarchical relationship, a confidence interval may be determined for each evaluation model in the plurality of evaluation models. Specifically, each of the evaluation samples in the evaluation dataset may be subjected to the evaluating procedure as shown in FIG. 9 to determine a corresponding evaluation result 960.

In embodiments of the present disclosure, with respect to an evaluation sample in the plurality of evaluation samples, a feature matrix may be determined for the evaluation sample based on the selected membership function. Further, the feature matrix may be combined with the weight vector according to the fuzzy operator specified by the evaluation model for determining the evaluation vector. In turns, a corresponding evaluation result may be determined from the evaluation vector. Further, the confidence interval for the generated evaluation model may be determined based on the plurality of evaluation results.

In embodiments of the present disclosure, the confidence interval may be determined according to existing data processing algorithms. In short, the confidence interval may reflect a consistency for the evaluation model across the plurality of evaluation samples in the evaluation dataset. The lower the confidence interval is, the more consistent the evaluation model shows. Accordingly, the evaluation model with the lowest confidence interval may be selected for further evaluation.

With these embodiments, the confidence interval for each evaluation model may be determined in an easy and effective way, in turns a stable and effective evaluation model may be selected accordingly. Moreover, as the above method 300 does not require the rich and deep expert knowledges about the association relationship between the plurality of observation items, the method 300 may be implemented in various environments with little prior knowledge. In addition, the method 300 only requires very basic taxonomy knowledge about the observation items in the collected dataset. Therefore, almost no manual work is involved in obtaining the final evaluation model. Compared with the existing solutions based on expert knowledges and manual work, the proposed method 300 may greatly increase the performance for building the evaluation model.

Having described how to select the evaluation model, the selected evaluation model may be used for processing a new sample. Continuing the above example, a skin state of a new person may be evaluated by the selected evaluation model. Specifically, various aspects of the person's skin may be collected based on the observation items in the trimmed the hierarchical relationship. For example, the observation items may include the pimple, the chloasma, the freckle, and so on, and thus a target observation sample including a group of measurements for the above observation items may be inputted into the selected evaluation model. Here, the target observation sample may be subjected to the evaluating procedure as shown in FIG. 9, and thus an evaluation result may be determined for the target observation sample based on the selected evaluation model. For example, the person's skin may be classified into a level from "excellent," "good," "moderate," and "poor." As the evaluation model here is a better evaluation model in the plurality of evaluation models, the evaluation result may be with a higher accuracy and can reflect a real state of the person's skin.

Figure 10:
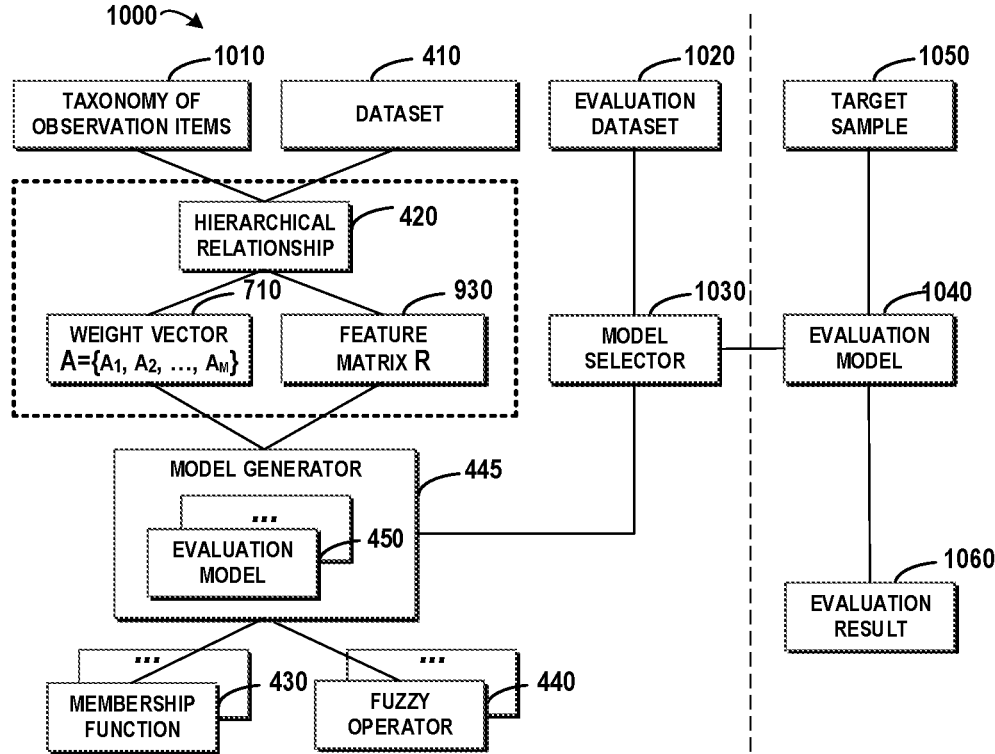
FIG. 10 depicts an example procedure for determining an evaluation result for a target sample based on a selected evaluation model according to an embodiment of the present disclosure.

Reference will be made to FIG. 10 for a whole procedure for evaluating a sample. FIG. 10 depicts an example procedure 1000 for determining an evaluation result for a target sample based on the selected evaluation model according to embodiments of the present disclosure. As shown in FIG. 10, the whole procedure may be divided into a training procedure (at the left side of the dash line) and an evaluating procedure (at the right side of the dash line). In the training procedure, a taxonomy of the observation items 1010 may be obtained first, here the taxonomy only requires basic relationship between the multiple observation items. Further, a dataset 410 including the plurality of observation samples may be obtained. As described in the proceeding paragraphs, the EFA algorithm may be used for trimming the original hierarchical relationship into the hierarchical relationship 420.

Further, based on a group of membership function 430 and a group of fuzzy operator 440, a plurality of evaluation models 450 may be generated by the model generator 445. Then, an evaluation dataset 1020 may be inputted into a model selector 1030 for selecting an evaluation model 1040. At this point, the training procedure ends and the evaluation model 1040 is obtained. The right side of the dash line shows the evaluating procedure, where a target sample 1050 is inputted into the selected evaluation model 1040 and thus an evaluation result 1060 for the target sample 1050 is outputted.

Although the above paragraphs describe embodiments of the present disclosure in the skincare product industry.

Alternatively and/or in addition to, embodiments of the present disclosure may be implemented in other environments. For example, the above method 300 may be used for determining an evaluation model for a controlling system. Supposing the controlling system may control environment parameters of a building, a dataset including a plurality of observation samples may be obtained. Here, the observation samples may include a group of observation items such as a temperature, a humidity, an air quality, and so on at various positions in the building. Based on the dataset, an evaluation model may be obtained for evaluating the state of the building. In another example, the above method 300 may be used for generating an evaluation model for evaluating a quality of a product in a manufacturing factory. At this time, the observation items may include a color, a size, a weight, and so on of the products.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

determining, by one or more processors, a hierarchical relationship between a plurality of observation items based on a dataset including a plurality of observation samples, an observation sample in the plurality of observation samples including a group of measurements for the plurality of observation items, respectively;

generating, by the one or more processors, a tree structure based on the plurality of observation items, a leaf node in the tree structure corresponding to an observation item in the plurality of observation items, and a root node in the tree structure corresponding to an evaluation result for the plurality of observation items;

trimming, by the one or more processors, the tree structure based on the plurality of observation samples;

generating, by the one or more processors, a plurality of evaluation models for evaluating an observation sample based on the hierarchical relationship according to a predefined group of membership functions and a predefined group of fuzzy operators, wherein the hierarchal relationship comprises the tree structure and a trimmed tree structure;

selecting, by the one or more processors, an evaluation model for a further evaluation from the plurality of evaluation models based on a plurality of confidence intervals for the plurality of evaluation models;

processing, by the one or more processors, a new sample using the evaluation model selected for further evaluation, wherein the new sample is comprised of a new group of measurements for the observation items corresponding to the trimmed tree structure of the hierarchal relationship; and generating, by the one or more processors, an evaluation result, wherein the evaluation result includes a classification according to one of the predefined group of membership functions.

2. The method of claim 1, wherein trimming the tree structure comprises: with respect to a subtree in the tree structure, determining, by the one or more processors, a weight between the root node of the subtree and a child node of the root node based on the plurality of observation samples; and removing, by the one or more processors, the child node in response to the weight meeting a predefined trimming rule.

3. The method of claim 1, wherein determining the hierarchical relationship further comprises:

determining, by the one or more processors, a group of weights between the root node of the trimmed tree structure and leaf nodes in the trimmed tree structure; and representing, by the one or more processors, the hierarchical relationship based on the trimmed tree structure and the group of weights.

4. The method of claim 3, wherein generating the plurality of evaluation models comprises:

generating the evaluation model in the plurality of evaluation models by:

selecting, by the one or more processors, a membership function from the predefined group of membership functions;

selecting, by the one or more processors, a fuzzy operator from the predefined group of fuzzy operators; and generating, by the one or more processors, the evaluation model based on the trimmed tree structure and the group of weights according to the selected membership function and the selected fuzzy operator.

5. The method of claim 1, wherein selecting the evaluation model comprises:

determining, by the one or more processors, the plurality of confidence intervals for the plurality of evaluation models based on an evaluation dataset, respectively, the evaluation dataset including a plurality of evaluation samples and an evaluation sample in the plurality of evaluation samples including a group of measurements for the group of observation items, respectively;

generating, by the one or more processors, a plurality of feature matrixes for the plurality of evaluation samples based on the evaluation model, respectively;

obtaining, by the one or more processors, a plurality of evaluation results based on the plurality of feature matrixes and the hierarchical relationship, respectively;

determining, by the one or more processors, a confidence interval in the plurality of confidence intervals for the evaluation model based on the plurality of evaluation results; and selecting, by the one or more processors, the evaluation model from the plurality of evaluation models based on the plurality of confidence intervals.

6. The method of claim 5, wherein determining the plurality of evaluation results, with respect to an evaluation sample in the plurality of evaluation samples, comprises:

determining, by the one or more processors, a feature matrix for the evaluation sample based on the selected membership function by obtaining a count of levels that are to be included in the evaluation result for the evaluation model and determining the feature matrix based on the count, the group of measurements included in the evaluation sample, and the selected membership function; and obtaining, by the one or more processors, the evaluation result in the plurality of evaluation results for the evaluation sample based on the feature matrix and a group of weights in the hierarchical relationship.

7. The method of claim 1, further comprising:

receiving, by the one or more processors, a target observation sample including the group of measurements for the group of observation items; and determining, by the one or more processors, the evaluation result for the target observation sample based on the selected evaluation model.

8. The method of claim 1, wherein the new sample is comprised of a group of skin observation measurements, wherein the evaluation result is a state of skin index of a user based on the new sample collected based on the observation measurements of the observation items of the trimmed tree structure, and wherein the state of the user's skin is within one of the predefined group of membership functions.

9. The method of claim 2, wherein the weight between the root node of the subtree and the child node of the root node is determined based on an Exploratory Factor Analysis (EFA) technique.

10. The method of claim 1, wherein the trimmed tree structure includes a group of weights for the plurality of observation items of the hierarchal relationship, wherein the group of weights are represented by a weight vector determined according to a Principal Component Analysis (PCA) algorithm.

11. The method of claim 10, wherein the weight vector is determined based on a number of the plurality of observation items and wherein the dataset is filtered to remove one or more measurements corresponding to one or more removed observation items of the plurality of observation items, wherein the observation items corresponding to the trimmed tree structure are represented in a matrix X.

12. The method of claim 11, wherein the matrix X is normalized to a normalized matrix Z, and wherein a correlation coefficient matrix C is determined according to the normalized matrix Z.

13. The method of claim 1, further comprising:

applying one or more clustering algorithms to the new group of measurements for the observation items to obtain a strain energy storage index, wherein the strain energy storage index includes a plurality of levels, wherein each of the plurality of levels corresponds to one of the classifications further corresponding to one of the predefined group of membership functions; and generating the plurality of evaluation models based on the predefined group of membership functions, wherein each of the plurality of evaluation models corresponds to one of the plurality of levels.

14. A computer-implemented system, comprising a computer processor coupled to a computer-readable memory unit, the memory unit comprising instructions that when executed by the computer processor implements a method comprising:

determining a hierarchical relationship between a plurality of observation items based on a dataset including a plurality of observation samples, an observation sample in the plurality of observation samples including a group of measurements for the plurality of observation items, respectively;

generating a tree structure based on the plurality of observation items, a leaf node in the tree structure corresponding to an observation item in the plurality of observation items, and a root node in the tree structure corresponding to an evaluation result for the plurality of observation items;

trimming the tree structure based on the plurality of observation samples;

generating a plurality of evaluation models for evaluating an observation sample based on the hierarchical relationship according to a predefined group of membership functions and a predefined group of fuzzy operators, wherein the hierarchal relationship comprises the tree structure and a trimmed tree structure;

selecting an evaluation model for a further evaluation from the plurality of evaluation models based on a plurality of confidence intervals for the plurality of evaluation models;

processing a new sample using the evaluation model selected for further evaluation, wherein the new sample is comprised of a new group of measurements for the observation items corresponding to the trimmed tree structure of the hierarchal relationship; and generating an evaluation result, wherein the evaluation result includes a classification according to one of the predefined group of membership functions.

15. The computer-implemented system of claim 14, wherein selecting the evaluation model comprises:

determining the plurality of confidence intervals for the plurality of evaluation models based on an evaluation dataset, respectively, the evaluation dataset including a plurality of samples and a sample in the plurality of samples including the group of measurements for the group of observation items, respectively;

generating a plurality of feature matrixes for the plurality of evaluation samples based on the evaluation model, respectively;

obtaining a plurality of evaluation results based on the plurality of feature matrixes and the hierarchical relationship, respectively;

determining a confidence interval in the plurality of confidence intervals for the evaluation model based on the plurality of evaluation results; and selecting the evaluation model from the plurality of evaluation models based on the plurality of confidence intervals.

16. The computer-implemented system of claim 14, wherein the new sample is comprised of a group of skin observation measurements, wherein the evaluation result is a state of skin index of a user based on the new sample collected based on the observation measurements of the observation items of the trimmed tree structure, and wherein the state of the user's skin is within one of the predefined group of membership functions.

17. A computer program product, the computer program product comprising a computer readable storage medium having program instructions embodied therewith, the program instructions executable by an electronic device to cause the electronic device to perform a method, the method comprising:

determining a hierarchical relationship between a plurality of observation items based on a dataset including a plurality of observation samples, an observation sample in the plurality of observation samples including a group of measurements for the plurality of observation items, respectively;

generating a tree structure based on the plurality of observation items, a leaf node in the tree structure corresponding to an observation item in the plurality of observation items, and a root node in the tree structure corresponding to an evaluation result for the plurality of observation items;

trimming the tree structure based on the plurality of observation samples;

generating a plurality of evaluation models for evaluating an observation sample based on the hierarchical relationship according to a predefined group of membership functions and a predefined group of fuzzy operators, wherein the hierarchal relationship comprises the tree structure and a trimmed tree structure;

selecting an evaluation model for a further evaluation from the plurality of evaluation models based on a plurality of confidence intervals for the plurality of evaluation models;

processing a new sample using the evaluation model selected for further evaluation, wherein the new sample is comprised of a new group of measurements for the observation items corresponding to the trimmed tree structure of the hierarchal relationship; and generating an evaluation result, wherein the evaluation result includes a classification according to one of the predefined group of membership functions.

18. The computer program product of claim 17, wherein selecting the evaluation model comprises:

determining the plurality of confidence intervals for the plurality of evaluation models based on an evaluation dataset, respectively, the evaluation dataset including a plurality of samples and a sample in the plurality of samples including the group of measurements for the group of observation items, respectively;

generating a plurality of feature matrixes for the plurality of evaluation samples based on the evaluation model, respectively;

obtaining a plurality of evaluation results based on the plurality of feature matrixes and the hierarchical relationship, respectively;

determining a confidence interval in the plurality of confidence intervals for the evaluation model based on the plurality of evaluation results; and selecting the evaluation model from the plurality of evaluation models based on the plurality of confidence intervals.

19. The computer program product of claim 17, wherein the new sample is comprised of a group of skin observation measurements, wherein the evaluation result is a state of skin index of a user based on the new sample collected based on the observation measurements of the observation items of the trimmed tree structure, and wherein the state of the user's skin is within one of the predefined group of membership functions.

* * * * *